US008610780B2

(12) United States Patent
Ding et al.

(10) Patent No.: US 8,610,780 B2
(45) Date of Patent: Dec. 17, 2013

(54) DISPLAY LIGHT LEAKAGE

(75) Inventors: Daniel Ding, San Jose, CA (US); Kuan Ying Lin, Mountain View, CA (US); Enkhamgalan Dorjgotov, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 124 days.

(21) Appl. No.: 13/209,051

(22) Filed: Aug. 12, 2011

(65) Prior Publication Data
US 2013/0038740 A1 Feb. 14, 2013

(51) Int. Cl.
*H04N 17/00* (2006.01)
*H04N 17/02* (2006.01)
*G06K 9/00* (2006.01)
*G09G 5/10* (2006.01)

(52) U.S. Cl.
USPC ............... 348/189; 382/181; 345/690

(58) Field of Classification Search
None
See application file for complete search history.

(56) References Cited

U.S. PATENT DOCUMENTS

| 6,606,116 | B1 * | 8/2003 | Poynter ......................... 348/189 |
| 7,136,056 | B2 | 11/2006 | Lee et al. |
| 7,995,098 | B2 | 8/2011 | Pedeville et al. |
| 2002/0118878 | A1 * | 8/2002 | Tanahashi et al. ............ 382/181 |
| 2005/0259153 | A1 * | 11/2005 | Oka ............................. 348/189 |
| 2006/0262147 | A1 * | 11/2006 | Kimpe et al. ................. 345/690 |
| 2009/0322887 | A1 * | 12/2009 | Kim ............................. 348/189 |
| 2012/0074851 | A1 | 3/2012 | Erinjippurath |

* cited by examiner

*Primary Examiner* — Jefferey Harold
*Assistant Examiner* — Sean Haiem
(74) *Attorney, Agent, or Firm* — Jennifer Luh

(57) ABSTRACT

Embodiments include systems and methods for objectively grading/rating a display. One embodiment may take the form of a method for grading display quality including capturing an image of the display and computing first and second parameter values from the captured image. The method also includes comparing the first parameter value against a threshold and, if the first parameter value exceeds the threshold, computing a grade wherein the second parameter is given a first weighting. If, however, the first parameter value is below the threshold, the method includes computing a grade wherein the second parameter is given a second weighting which is greater than the first weighting.

21 Claims, 8 Drawing Sheets

DISPLAY LIGHT LEAKAGE

TECHNICAL FIELD

The present application is related to electronic displays and, more particularly, to standardizing light leakage determinations for electronic displays, such as liquid crystal displays.

BACKGROUND

Electronic displays used in electronic devices have a variety of different parameters that indicate the capabilities of the devices. For example, the displays may be rated based on their native resolution, refresh rate, and contrast capability, among others. Each of these parameters may impact the quality of a user's experience while viewing the display.

In some cases, other characteristics of displays may also impact the user's experience. One characteristic, in particular, is light leakage. Light leakage generally refers to light from the display that is unintentionally viewable by a user. Light leakage may be caused by mechanical pressure being applied to the display and creating a light path. The pressure may be caused be external pressure, internal thermal expansion, or a non-uniformity in the material itself, among other possible causes. Hence, light leakage may be more prevalent in displays that are fitted within smaller electronic device housings, such as notebook and tablet computing devices.

Testing for light leakage has typically included subjective visual inspection of the displays and rating the displays based on the visual inspection. As can be appreciated, this provided inconsistent results. Some inspectors may have been more sensitive to the light leakage than others and/or may have graded the displays too harshly while others may have graded them too leniently.

SUMMARY

Embodiments may take the form of systems and methods for objectively grading/rating a display. In particular, one embodiment may take the form of a method for grading display quality including capturing an image of the display and computing first and second parameter values from the captured image. The method also includes comparing the first parameter value against a threshold and, if the first parameter value exceeds the threshold, computing a grade wherein the second parameter is given a first weighting. If, however, the first parameter value is below the threshold, the method includes computing a grade wherein the second parameter is given a second weighting which is greater than the first weighting.

Another embodiment may take the form of a method for grading a display including capturing an image of the display and dividing a perimeter of the image into a set of blocks. The method also includes generating an intensity map of the captured image and determining a peak intensity for a bin. Further, a local contrast level for a plurality of cells in each block is calculated and a maximum local contrast level for a cell is determined. A grade for the display based on the maximum intensity and local contrast levels is determined.

Yet another embodiment may take the form of a system for objectively rating a display. The system includes an image capture device, a first fixture configured to hold the image capture device in a fixed position and a second fixture configured to secure a display. The image capture device is directed towards the second fixture. Additionally, the system includes a computing device in communication with the image capture device and configured to receive an image from the image capture device. The computer is configured to divide a perimeter of the image into a set of bins, create an intensity map of the captured image, and determine a maximum intensity for a bin. Further, the computer is configured to calculate a local contrast level for the captured image, determine a maximum local contrast level and determine a grade for the display based on the maximum intensity and local contrast levels.

While multiple embodiments are disclosed, still other embodiments of the present invention will become apparent to those skilled in the art from the following Detailed Description. As will be realized, the embodiments are capable of modifications in various aspects, all without departing from the spirit and scope of the embodiments. Accordingly, the drawings and detailed description are to be regarded as illustrative in nature and not restrictive.

DETAILED DESCRIPTION

Figure 1:
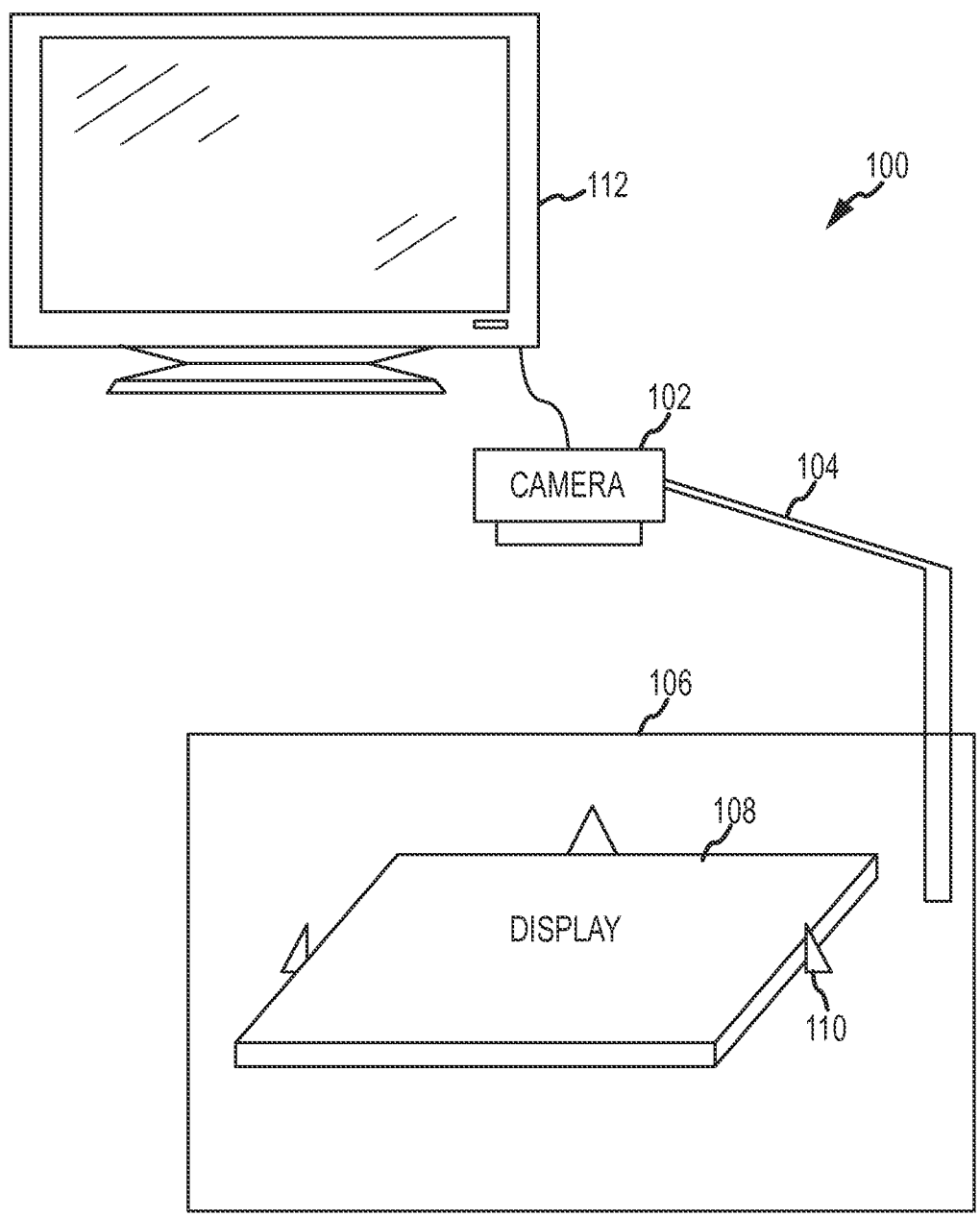
FIG. 1 illustrates a system for objectively grading a display.

Embodiments may take the form of a two-order method to standardize objective grading of a display such as a liquid crystal display (LCD). It should be appreciated that the teachings contained herein may be applied to other display technologies. Indeed the methodology may be applied to any display technology that may incur luminous non-uniformities. A first method evaluates the light leakage intensity of the display. In particular, the method evaluates the display's light leakage intensity against a threshold. Generally, if a display has a light leakage intensity lower than a threshold level a user is less likely to notice or be bothered by light leakage. As such, the light leakage intensity of the display may be a significant parameter for determining the impact and/or noticeability of light leakage by a viewer/user. A second method evaluates local contrast levels. The local contrast levels become more evident (and hence more important) as the intensity of any given display decreases. That is, the human eye is able to better discern contrasts in regions of the display when the intensity is not above a level that would overwhelm the local contrast; as intensity decreases, sensitivity to contrast increases. Displays that fail the two-order method may be rejected as unsuitable for use, sales or other purposes.

A system for objectively grading/rating displays is provided herein that attempts to mimic the sensitivity of the human eye using these two parameters. The system generally includes a camera held in position by a first fixture that is configured to capture an image of a display that is held in place by a second fixture. The captured image is provided to a computing device which is configured to determine first and second parameter values of the captured image and use the parameter values to objectively grade the display.

The method of objectively grading the display while mimicking the sensitivity of the human eye includes capturing an image of the display and computing a first parameter value from the captured image. A second parameter value may also be computed from the captured image. The first parameter value may be compared against a threshold and if the first parameter value exceeds the threshold a grade is computed that minimizes the impact of the second parameter. In some embodiments, the second parameter may not be considered in the grade calculation. That is, in some embodiments, the minimization of the second parameter may result in the grade being based solely on the first parameter. If the first parameter value is below the threshold, the grade is computed giving greater weight to the second parameter.

Yet another embodiment may take the form of a method for grading a display including capturing an image of the display and dividing a perimeter of the image into a set of bins. An intensity map of the captured image is created based on the bins and a maximum intensity for a bin is determined. Additionally, local contrast levels are calculated for the captured image and a maximum local contrast level is determined. A grade or rating for the display is then determined and may be based on the maximum intensity and local contrast levels. In some embodiments, the grade is determined by referencing a look-up table, database or other data structure. In another embodiment, the grade is determined by computing a light leakage indicator according to the formula:

$$LLI = \text{Log}(P) + \partial P \times (W_s \times S) \times \exp(1 - P/P_t),$$

where P is the peak intensity, $S = \text{Max } (2|(L_{i,j} - L_{i+/-1,j+/-1})|/(L_{i,j} + L_{i+/-1,j+/-1}))$, $\partial P$ is a difference in Log(P) between a set of grades, Ws is a slope weight factor, and Pt is a human correlation coefficient indicating where the effects of S starts to dominate (e.g., where the contrast becomes more important relative to the intensity). As may be appreciated, S represents a maximum contrast level between adjacent bins of the display. $L_{i,j}$ represents the luminance of a particular bin having coordinates i,j with "i" indicating a column number and "j" indicating a row number, for example. $L_{i+/-1,j+/-1}$ represents the luminance of blocks located to either side of bin $L_{i,j}$ (e.g., $L_{j+/-1}$) and above and below bin $L_{i,j}$ (e.g., $L_{i+/-1}$). In calculating S, therefore, a particular bin's luminance ($L_{i,j}$) is compared with the luminance of blocks near it to determine a local contrast level.

Turning to the drawings and referring initially to FIG. 1, a system 100 for objectively grading a display device is illustrated. The system 100 includes a camera 102 that is held in position by a fixture 104. The camera 102 may be a charge coupled device (CCD) camera, for example, or other suitable image capture device. Suitable cameras may be obtained from a variety of sources. For example Radiant Imaging provides several suitable cameras, such as the Radiant PM 1433 and Radiant PM-1000 model number cameras. It should be appreciated, however, that other cameras and cameras from other manufacturers may be implemented as well. Generally, the camera 102 may capture a high resolution monochromatic image of a display for analysis and grading of the display. For example, the camera 102 may be configured to capture a monochromatic image with between two and 12 megapixels. More particularly, in one embodiment the image may be a 3000×2000 pixel monochromatic image.

The fixture 104 is configured to secure the camera 102 in a fixed location, at a fixed distance from a reference point or plane, which may be a second fixture 106 (and thus from any display held by the second fixture). The fixture 104 may include one or more arms or support structures to prevent movement of the camera 102. In some embodiments, the fixture 104 may be coupled to a second fixture 106 that is configured to secure a display 108 for testing. The display 108 may take the form of a liquid-crystal display (LCD), light emitting diode (LED), organic LED, plasma, or other display technology. The second fixture 106 may take the form of a surface on which a display rests. One or more guide members 110 may be provided on the surface so that the display 108 may be properly positioned relative to the camera 102. The camera 102 and display 108 are therefore maintained in fixed location relative to each other. Moreover, as other displays are positioned on the second fixture 106 for testing, the camera 102 may consistently capture a substantially similar image of each display, thus providing repeatability and reliability for testing.

The camera 102 may be in communication with a computer 112 that is configured to process images captured by the camera and provide a grade/rating for the display. The computer 112 may be provided in a variety of different forms and may communicate with the camera through different modes. For example, in some embodiments, the computer 112 may take the form of a application specific integrated circuit that is provided solely for the purpose of grading images of displays and the computer and camera may be an integrated unit. In other embodiments, the computer 112 may be independent from the camera 102. For example, the computer 112 may be a desktop of notebook computer that may be communicatively coupled to the camera 102. In still other embodiments, the camera 102 may be configured to provide captured images to a remote computer system via a network.

Figure 2:
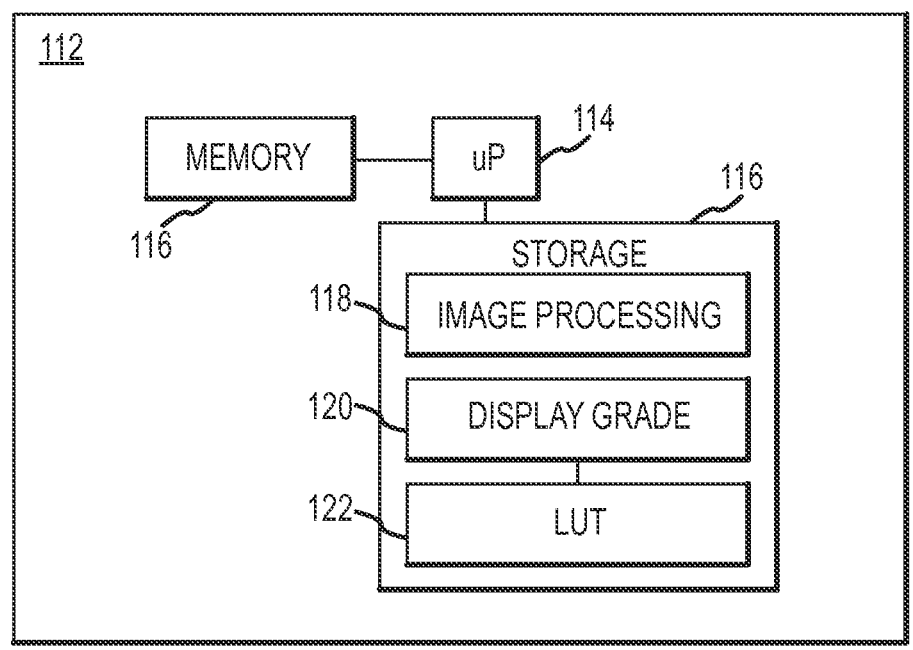
FIG. 2 is a block diagram of a computing device of the system of FIG. 1.

FIG. 2 is an example block diagram of the computer 112. As shown, the computer 112 includes a microprocessor 114 with memory 116 and storage 118 coupled thereto. The memory 114 may take any suitable form such as random access memory (RAM), dynamic RAM, static RAM, and so forth. The storage 116 may also take any suitable form and may include hard disk drives, semiconductor drives, flash storage, and so forth. The storage 116 may store software executable by the microprocessor 114 for image processing 118 and display rating/grading 120. One or more look up tables (LUT) 122 may also be stored in the storage 116 and used in the grading/rating process.

Figure 3:
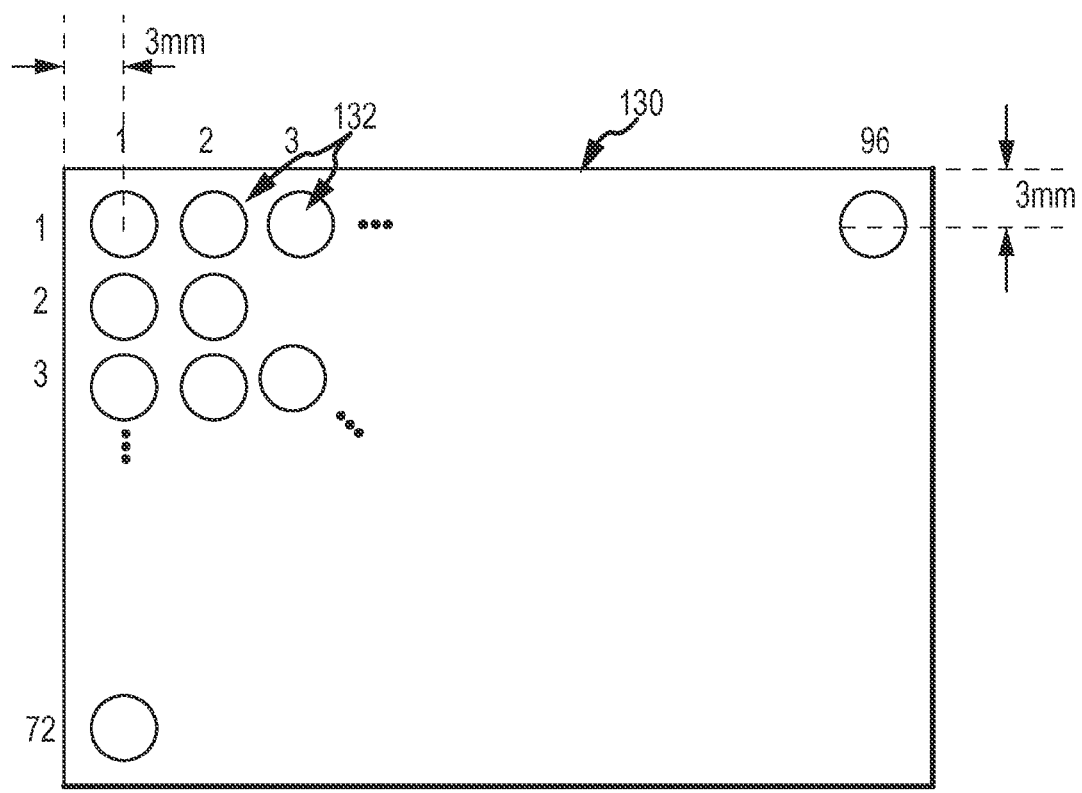
FIG. 3 illustrates an example image of a display divided into an array of bins.

FIG. 3 depicts one sample way for initial processing of the display image 130. The pixels of the image are divided into bins 132. The size of the bins 132 may be selected arbitrarily. For example, in one embodiment where the image is a 3000× 2000 pixel monochromatic image, the pixels may be divided into 2 mm diameter bins to form a 72×96 bin array, as shown. The luminance of each pixel may be normalized by the luminance of the center region. That is, the luminance of the pixels may be represented based on their luminance relative to the luminance of the center region. For example, if the center region has a luminance of 50 and a particular pixel has a luminance of 60, the luminance of the pixel may be normalized to +10. The normalization allows for a determination of the luminance of pixels relative to the center region of a particular display, thus allowing for consistent evaluation of displays having varied luminance levels. The center region may be defined as the region bounded by the perimeter blocks, but not including the perimeter blocks. The individual bin luminance is the average luminance of the pixels contained in the bin.

Figure 4:
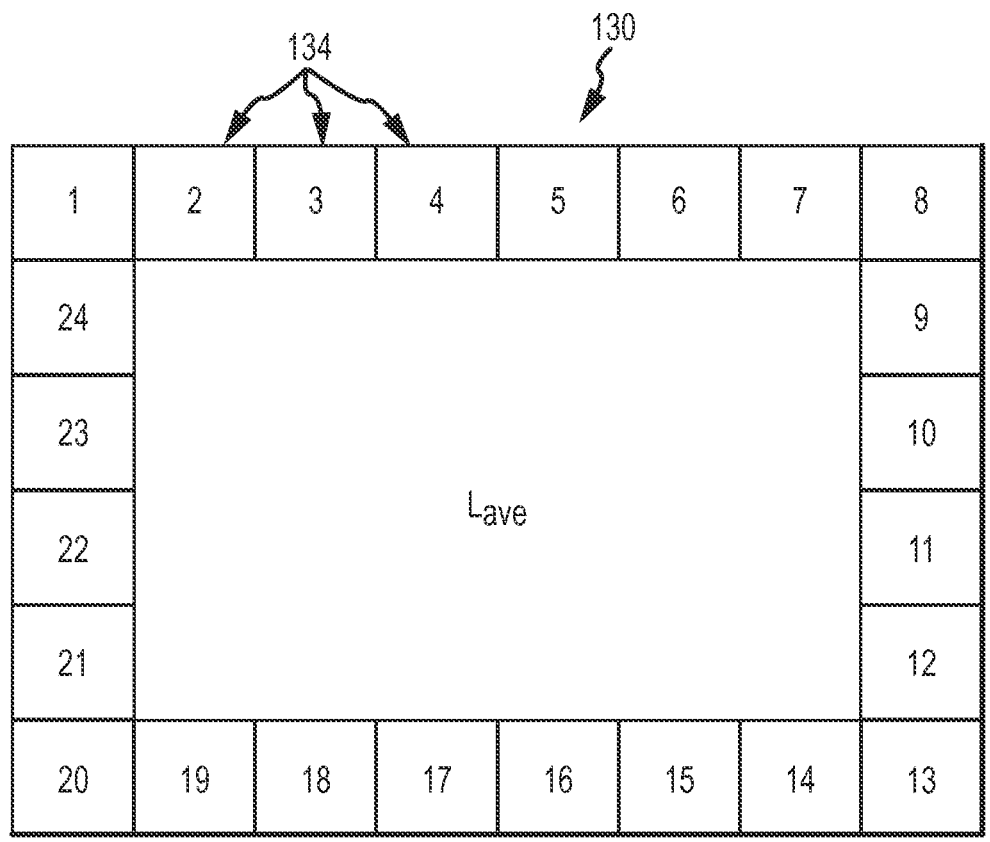
FIG. 4 illustrates the example image of the display of FIG. 3 having a perimeter divided into blocks.

Additionally, the perimeter of the display image 130 may be divided into blocks 134. In one embodiment, the blocks may be 3 mm square. Following the foregoing example, the perimeter of the display may be divided into 24 3 mm by 3 mm blocks, as shown in FIG. 4, with each block containing approximately 100 bins. Peak brightness is calculated as P=Max($L_{i,j}$), where i=1:72, j=1:96. The Max($L_{i,j}$) is determined simply by calculating the brightness of each of the bins and selecting the brightest bin. In one embodiment, $L_{i,j}$= ($L_{i,j}$−$L_{dark}$)/$L_{dark}$, where i=1:72, j=1:96, and $L_{dark}$=Average ($L_{center}$) where the $L_{center}$ is the average luminance of the center bins shown in FIG. 4. It should be appreciated that this definition can be modified in different embodiments to accommodate different failure modes.

In this example, the array of bins is a 72 column by 96 row array. It should be appreciated that in other embodiments the array may have different dimensions (e.g., different number of columns and/or rows).

The local contrast, which may also be referred to as the worst neighboring bin, may be calculated as:

$$S = \frac{2|(L_{i,j} - L_{i+/-1,j+/-1})|}{(L_{i,j} + L_{i+/-1,j+/-1})},$$

where "S" is the local contrast. $L_{i+/-1,j+/-1}$ represents the luminance of blocks located to either side of bin $L_{i,j}$ (e.g., $L_{i+/-1}$) and above and below bin $L_{i,j}$ (e.g., $L_{j+/-1}$). In calculating S, therefore, a particular bin's luminance ($L_{i,j}$) is compared with the luminance of blocks near it to determine a local contrast level. Hence, the local contrast may be determined by taking the luminance for a given bin (i,j) and comparing it with each of the bins immediately adjacent to it. Specifically, for each adjacent block in the X and Y directions, subtracting the luminance, multiplying the result by 2 and then dividing by the sum of the given bin's luminance and the adjacent bin.

In some embodiments, peak intensity and local contrast are calculated in the 24 perimeter blocks excluding the center region. For each block, the maximum peak and local contrast of that particular region are used as the light leakage indicator arguments. If the maximum peak and local contrast are located on the border of two blocks then the embodiment regards the light leakage indicator (LLI) of both regions as being identical.

Figure 5:
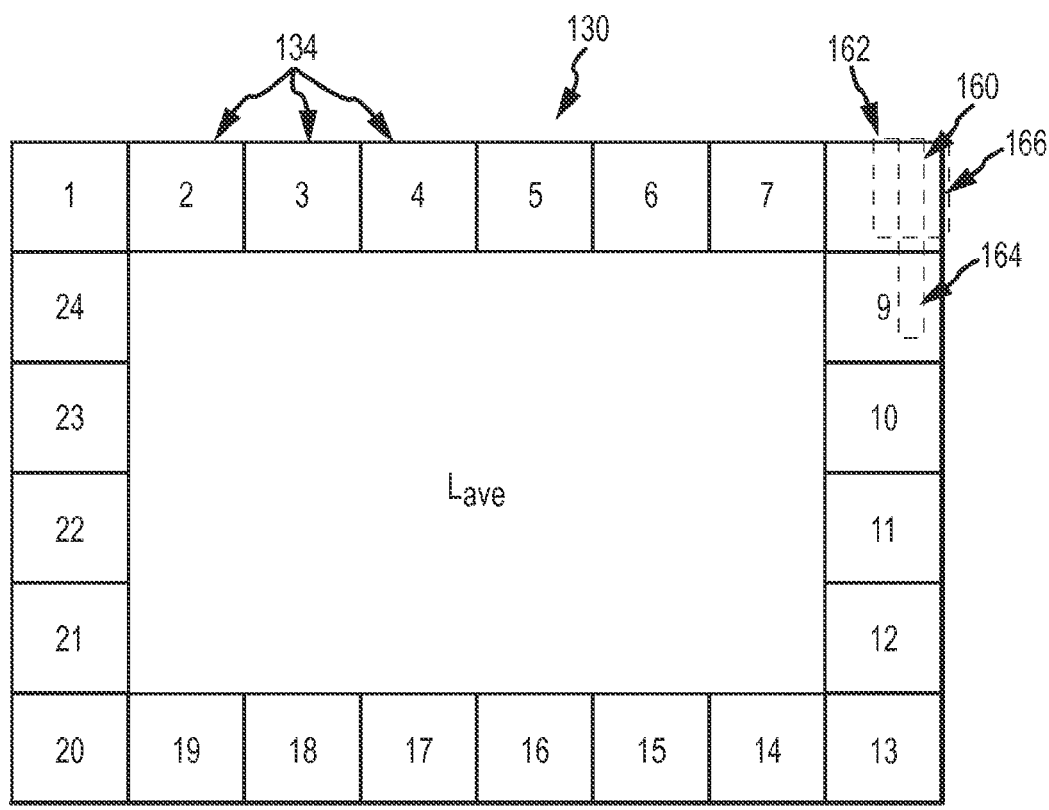
FIG. 5 illustrates a block of FIG. 4 further divided for a local contrast level determination.

The local contrast calculation need not be performed at the pixel, bin, or block level. In some embodiments, for example, the blocks may be further divided. In particular, the blocks may be divided up into 1 mm by 3 mm blocks and a local contrast level may be determined for each new block (or cell) by comparing its intensity with the intensity of each of the new blocks to which it is adjacent. This is shown in FIG. 5 with the new block 160 being compared with each of the new blocks 162, 164, 166 to which it is a neighbor. It should be appreciated that the size of the new blocks may be arbitrarily assigned and generally, the smaller the size of the new blocks will provide for a more sensitive level of detection. Alternatively, the larger the blocks, the more quickly the processor may be able to process the information and provide a rating. As such there is a classic tradeoff between sensitivity and efficiency.

It should be appreciated, the other metrics may be used as additional or alternative parameters for light leakage determination and display grading. For example, total volume may be used in conjunction with or independent from other parameters such as contrast and bin brightness. Total volume is calculated as V=Sum ($L_{i,j}$) and is the sum of brightness of all bins including the center region.

Figure 6:
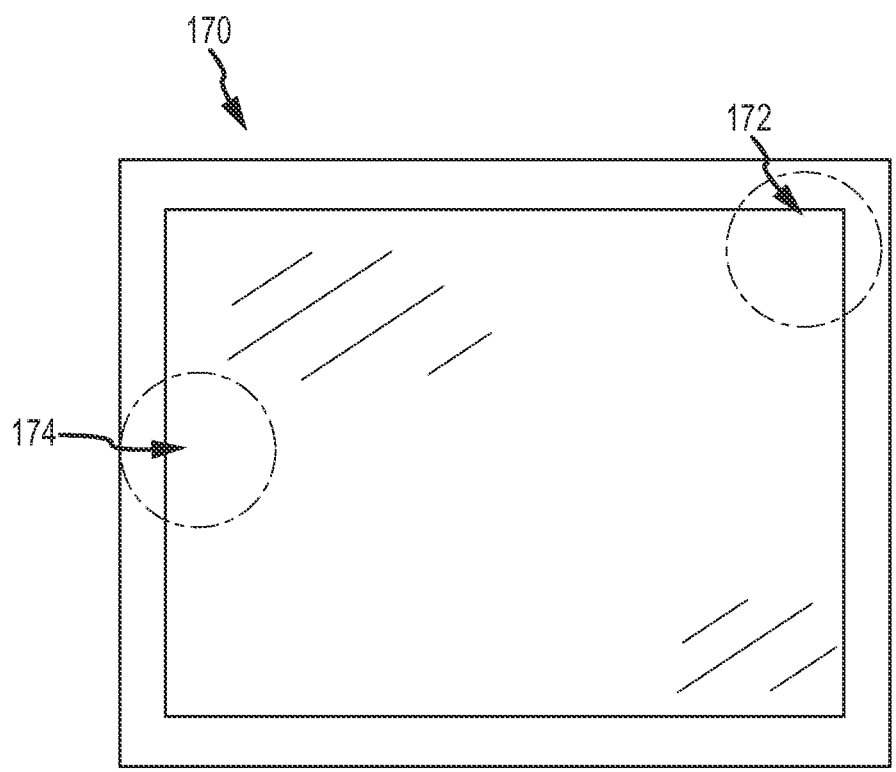
FIG. 6 illustrates a display having regions of light leakage.

FIG. 6 illustrates an image of a display 170 captured by the camera 112. Light leakage may be seen about the perimeter of the display. In particular, a first region 172 may exhibit light leakage with a high peak intensity and a low local contrast level. A second region 174 may exhibit low peak intensity level but a high local contrast. Generally, when the intensity if bright and gradually disappears, as in the first region, then the light leakage intensity peak is the dominant indicator of perceived display quality. When the light leakage peak intensity is not so bright, however, the sharp fall-of in intensity of local contrast is the dominant indicator. While it should be appreciated that the intensity and local contrast parameters may be combined and used in various different ways to grade the display a peak intensity level for the display may be used in conjunction with a "worst-case" local contrast to determine a grade of the display. Generally, the purpose of the local contrast or worst neighbor bin is to fail units have lower than the threshold peak intensity but have sharp contrast with respect to neighboring bins or background.

A light leakage indicator (LLI) may be calculated using the peak intensity and local contrast level. Specifically, the following equation may be used:

$$LLI = \text{Log}(P) + \partial P \times Ws \times S \times \exp(1 - P/Pt),$$

where P=Max($L_{i,j}$) and $$S = \frac{2|(L_{i,j} - L_{i+/-1,j+/-1})|}{(L_{i,j} + L_{i+/-1,j+/-1})},$$

as defined above. ∂P=Delta Log(P) between grade levels (e.g., the difference between the log(P) between a grade A and a grade D); Ws=slope weight factor, and Pt is a human correlation coefficient indicating where the effects of S starts to dominate (e.g., where the contrast becomes more important relative to the intensity). Pt may depend on the failure mode and the intensity location spread of the display, among other factors. Ws may depend upon the pass/fail criteria for a particular display and may be adjusted for tighter requirements. Indeed, each of the parameters may be adjusted to suit a desired pass/fail requirement.

Ws and Pt may each be determined empirically using a check up table that is updated as data is collected. For example, a number of displays may be graded by humans to determine the contours of a curve that defines how a human may perceive displays. The data collected may include feedback from customers regarding display performance, as well as observations from graders in a factory, and/or other sources. The data from customers may take the form of pass/fail criteria that is factored in for the display grading. Ws and Pt may then be curve-fitted based on the collected data to provide a curve that correlates with human observation. Thus, a machine/computer is trained to provide an objective grading that mimics humans.

Figure 7:
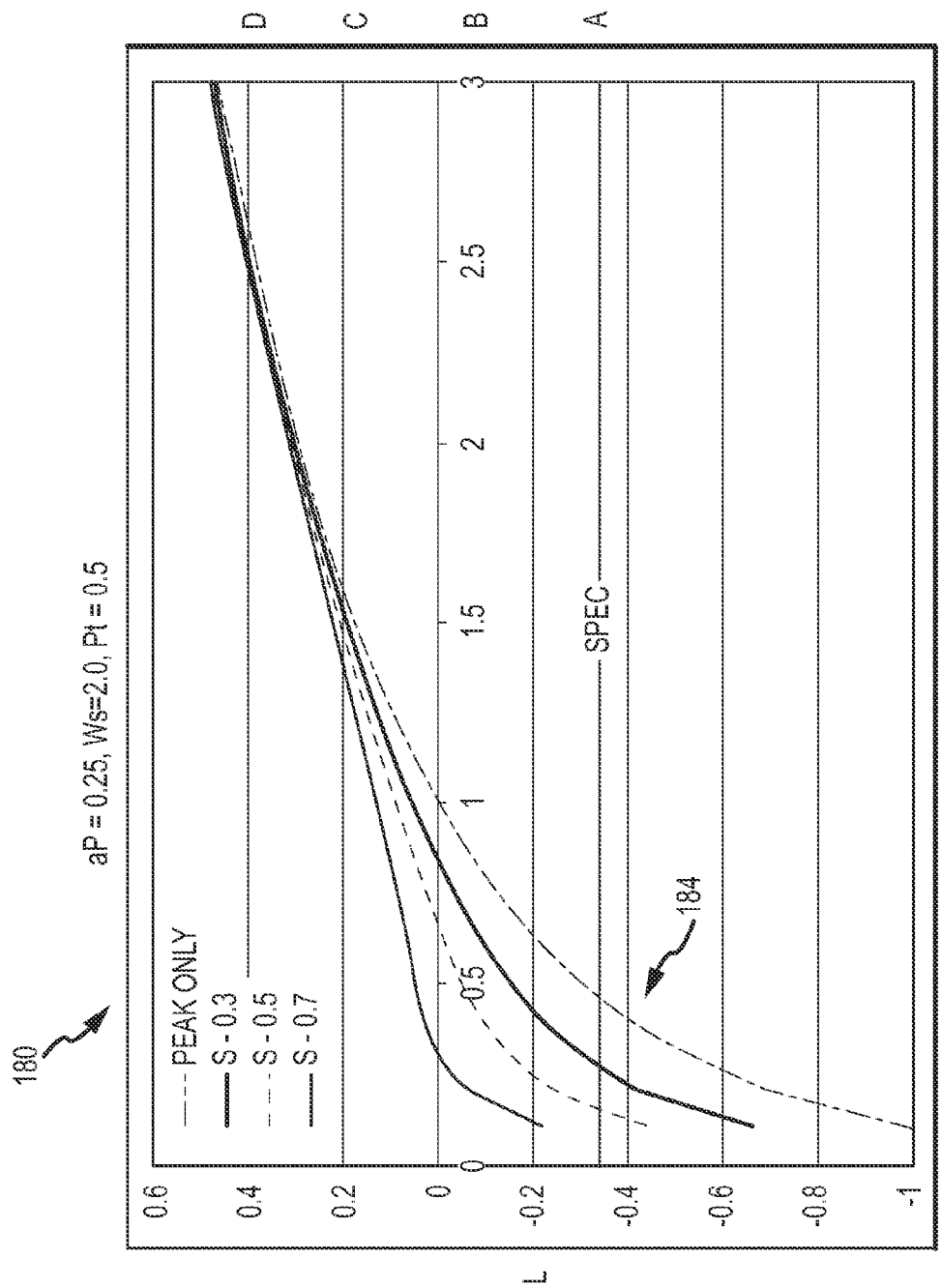
FIG. 7 is a plot of a light leakage indicator versus peak intensity and includes four plot lines, each having a different local contrast level.

FIG. 7 is a plot 180 of LLI versus peak intensity with ∂P=0.25, Ws=2.0, and Pt=0.5. Four separate plot lines are depicted based on different values for S. Starting with the uppermost plot line 182 and progressing downward S=0.7, 0.5 and 0.3. The lowest plot line 184 illustrates the LLI with only peak intensity considered (i.e., with a local contrast component). As may be seen, as the peak intensity P increases (moving from left to right), it becomes the dominant factor and the local contrast level effect decreases. Conversely, as the peak intensity decreases and falls below a particular level the local contrast level becomes more dominant. In this example, the threshold is set at approximately 0.5.

Table 1 illustrates an example grade scale based sole on the peak intensity. Actual numbers may vary between embodiments and iterations. Indeed, the grading scale may be continuously fine tuned and/or modified based on human perception and as the pool of displays tested increases, thus providing a more robust scale based on a diversity of displays tested. An "A" grade may be received when the peak is 0.45, a "B" grade when the peak is 0.80, a "C" when peak if 1.50 and a "D" when peak is 2.50. This grade scale, however, may not reflect how a human will view the displays with the respective peak intensity values. This is because at the lower peak levels, local contrast may more easily be perceived and may be considered or factored in, as discussed above, and as included in the LLI calculation.

TABLE 1

|   | Peak | Log (Peak) |
|---|---|---|
| A | 0.45 | −0.34678749 |
| B | 0.80 | −0.09691001 |
| C | 1.50 | 0.176091259 |
| D | 2.50 | 0.397940009 |

A display grading system may be implemented using the calculated LLI. In the grading system, the highest value light leakage indicator is taken as the LLI of the panel. Hence, the block with the worst LLI may determine of the light leakage score for the display. The LLI may then be converted to light leakage score using the binning rule of Table 2, as follows. In other embodiments, the light leakage score may be determined using parameters other than the worst LLI. For example, in some embodiments, a next to worst LLI may be utilized and the worst LLI may be excluded as an outlier. In still other embodiments, an average, mean or other such statistical variant of LLI may be utilized.

TABLE 2

| LLI | Score |
|---|---|
| <−0.347 | 1 |
| <−0.26 | 2 |
| <−0.17 | 3 |
| <−0.097 | 4 |
| <−0.01 | 5 |
| <0.08 | 6 |
| <0.18 | 7 |
| >0.18 | 8 |

The light leakage score may be used to look up a grade in the LUT 122. An example, LUT 122 is shown in Table 3. The LUT 122 may include rankings/grades that correlate to the number grade of Table 2. In other embodiments, the LUT may include ranges for both the local contrast and peak intensity levels and a grade/rating may be determined from those two parameters directly.

Table 3 illustrates an example LUT that includes peak intensity, local contrast, numerical grade and a ranking/grade. In Table 3 Peak (P) and Local Contrast (S) are multiplied by 100 for the sake of showing whole numbers. However, it should be appreciated that the LUT 122 may utilize any numerical form including decimals or fractions. Further, it should be appreciated that other parameters may be used for grading and the LUT 122 may be configured to accommodate other parameters.

TABLE 3

| | LCPI Grade | | |
|---|---|---|---|
| Peak Intensity | Local Contrast | Ranks | Num Grade |
| <45 | <15 | A | 1 |
| | <35 | A− | 2 |
| | <50 | B+ | 3 |
| | <80 | B | 4 |
| | >80 | B− | 5 |
| 45 to 80 | <15 | A− | 2 |
| | <25 | B+ | 3 |
| | <42 | B | 4 |
| | >42 | B− | 5 |
| 80 to 100 | <20 | B+ | 3 |
| | <25 | B | 4 |
| | <42 | B− | 5 |
| | <45 | C+ | 6 |
| | >45 | C | 7 |
| 100 to 150 | <25 | B | 4 |
| | <42 | B− | 5 |
| | <50 | C+ | 6 |
| | <60 | C | 7 |
| | >60 | C− | 8 |
| 150 to 180 | <25 | B | 4 |
| | <35 | B− | 5 |
| | <42 | C+ | 6 |
| | <50 | C | 7 |
| | <70 | C− | 8 |
| | >70 | D+ | 9 |
| 180 to 250 | <50 | C | 7 |
| | >50 | C− | 8 |
| >250 | <50 | C− | 8 |
| | <70 | D+ | 9 |
| | >70 | D | 10 |

As shown in Table 4, the LUT 122 may include a volume intensity parameter from which a grade may be determined. The volume intensity parameter may be an indication of the total intensity of the display and may be calculated in different ways. In one embodiment, it may be calculated by summing the intensity of the bins. In other embodiments, the volume intensity parameter may be generalized as an average intensity of each bin. In still other embodiments, a volume intensity may be calculated for less than the entire display. For example, a volume intensity may be calculated for a block of bins that may include one or more bins that include a highest local contrast level. Further, the volume intensity parameter may be used in a variety of contexts. For example, it may be used as a third metric to provide three dimensions in the grading of the display. In other embodiments, the volume intensity may be used as an integrated parameter that is used together with one or both of the intensity and local contrast parameters. In still other embodiments, the volume intensity parameter may be used in some contexts as an overall indication of the quality of the display.

TABLE 4

| | Global Grade | | |
|---|---|---|---|
| Peak Intensity | Volume Score | Ranks | Num Grade |
| <45 | <103.4 | A | 1 |
| | <241.2 | A− | 2 |
| | <344.5 | B+ | 3 |
| | <551.25 | B | 4 |
| | >551.25 | B− | 5 |
| 45 to 80 | <103.4 | A− | 2 |
| | <172.3 | B+ | 3 |
| | <289.4 | B | 4 |
| | >289.4 | B− | 5 |
| 80 to 100 | <137.8 | B+ | 3 |
| | <172.3 | B | 4 |

TABLE 4-continued

| | Global Grade | | |
|---|---|---|---|
| Peak Intensity | Volume Score | Ranks | Num Grade |
| | <289.4 | B− | 5 |
| | <310.1 | C+ | 6 |
| | >310.1 | C | 7 |
| 100 to 150 | <172.3 | B | 4 |
| | <289.4 | B− | 5 |
| | <344.5 | C+ | 6 |
| | <413.4 | C | 7 |
| | >413.4 | C− | 8 |
| 150 to 180 | <172.3 | B | 4 |
| | <241.2 | B− | 5 |
| | <289.4 | C+ | 6 |
| | <344.5 | C | 7 |
| | <482.3 | C− | 8 |
| | >482.3 | D+ | 9 |
| 180 to 250 | <344.5 | C | 7 |
| | >344.5 | C− | 8 |
| >250 | <344.5 | C− | 8 |
| | <482.3 | D+ | 9 |
| | >482.3 | D | 10 |

The grades/rankings provided in the LUT 122 may be empirically determined. That is, a large number of displays may subjectively be graded by humans and a peak intensity and local contrast level for each display may be objectively determined using the camera 102 and computer 112. The peak intensity and local contrast levels may then be correlated and placed into the LUT 122. This enables the system to provide results that mimic those of a human.

Figure 8:
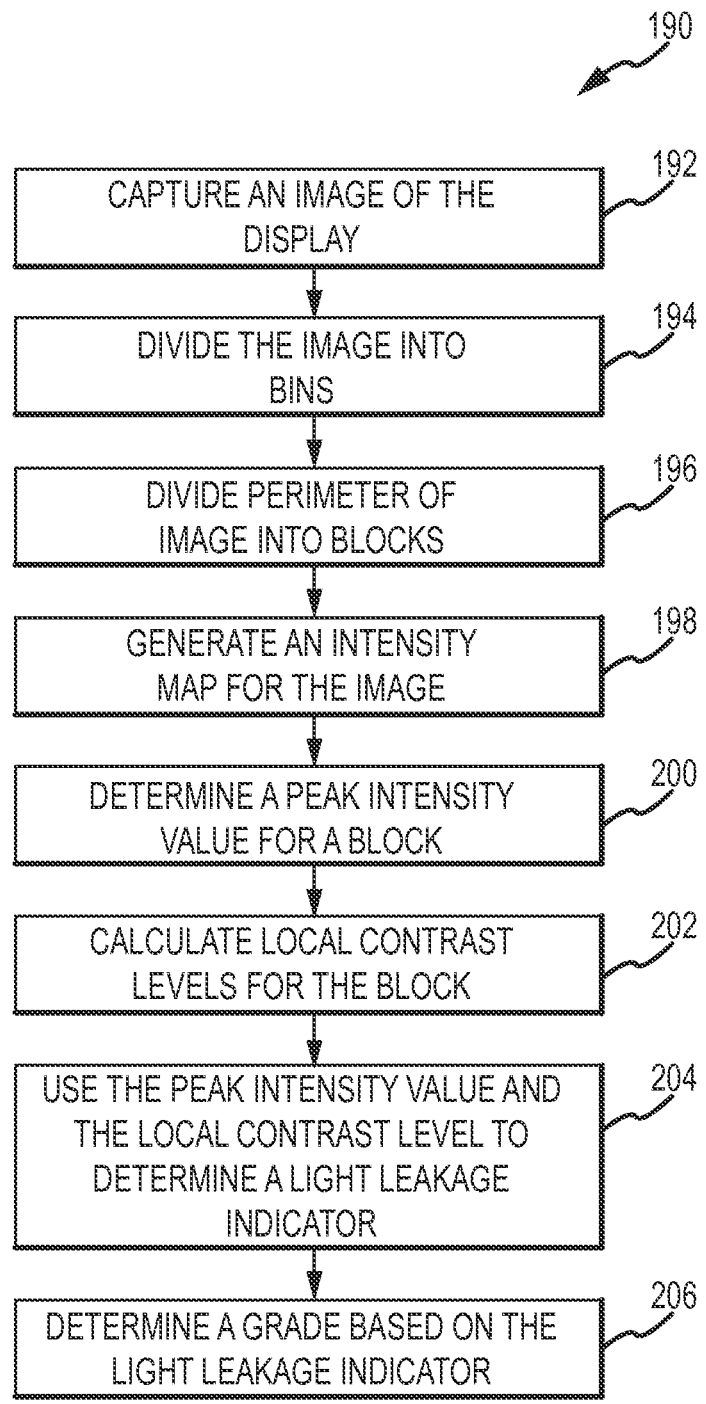
FIG. 8 is a flow chart illustrating a method for grading display quality.

FIG. 8 is a flow chart depicting a method 190 for grading a display in accordance with an embodiment. Initially, an image is captured by the camera (Block 192) and the image is processed to divide pixels into bins (Block 194). Further, the perimeter of the image is divided into blocks (Block 196). An intensity map of the image is then generated (Block 198) and a peak intensity is determined for a block (Block 200). A local contrast level is then calculated (Block 202) and the peak intensity and local contrast level is used to calculate a light leakage indicator (Block 204). The light leakage indicator is then used to determine a grade for the display (Block 206).

Although several example embodiments are discussed above, it should be appreciated by those of ordinary skill in the art that the contents of this document may be readily adapted to various other embodiments without requiring any inventive step. For example, in some embodiments, artificial intelligence may be implemented to determine the grading system for the display. That is, a neural network, a support vector machine, or the like may be implemented to further enable the system to mimic human determination of display quality. Accordingly, the concepts, methods, systems, apparatuses and the like discussed herein are provided by way of illustration and not limitation.

The invention claimed is:

1. A method for rating display quality comprising:
   capturing an image of the display;
   computing a first parameter value from the captured image;
   computing a second parameter value from the captured image;
   comparing the first parameter value against a threshold;
   if the first parameter value exceeds the threshold, computing a grade wherein the second parameter is given a first weighting;
   if the first parameter value is below the threshold, computing a grade wherein the second parameter is given a second weighting which is greater than the first weighting, wherein the first parameter value comprises a peak intensity of the display, wherein the second parameter value comprises a local contrast; and
   computing a coefficient that indicates when the second parameter value receives the second weighting.

2. The method of claim 1, wherein the first weighting is given to substantially eliminate the second parameter from impacting the grade.

3. The method of claim 1 further comprising generating an intensity map of the captured image.

4. The method of claim 3, wherein generating the intensity map comprises dividing the display perimeter into a set of equal sized regions.

5. The method of claim 3, wherein the intensity map is generated by dividing the image into blocks and computing an average luminance of a set of pixels within each block.

6. The method of claim 5, wherein the blocks are 2 mm by 2 mm.

7. The method of claim 6, wherein computing the first parameter value comprises subtracting the intensity of a center of the captured image from a block having a maximum intensity.

8. The method of claim 1, wherein the second parameter value is computed by dividing each block into cells and comparing an intensity of each cell with intensities of adjacent cells to determine a difference in the intensities of adjacent cells.

9. The method of claim 8, wherein the cells are 1 mm by 3 mm.

10. The method of claim 1 further comprising determining a light leakage indicator.

11. The method of claim 10, wherein the light leakage indicator is determined by referencing a look up table using a peak intensity value and a local contrast value.

12. The method of claim 10, wherein the light leakage indicator is determined according to the formula: $L = \text{Log}(P) + (\partial P)(W_s)(S^{(1-P/P_t)})$, where P is the peak intensity, $$S = \frac{2|(L_{i,j} - L_{i\pm1, j\pm1})|}{(L_{i,j} + L_{i\pm1, j\pm1})},$$

$\partial P$ a difference in Log(P) between a set of grades, Ws is a slope weight factor, and Pt is a threshold peak where an effect of S starts decreasing.

13. A method for grading a display comprising:
   capturing an image of the display;
   dividing a perimeter of the image into a set of blocks, wherein each block comprises a plurality of bins;
   creating an intensity map of the captured image;
   determining a maximum intensity for a bin in the plurality of bins;
   calculating a local contrast level for the plurality of bins in each block;
   determining a maximum local contrast level for a block comprising comparing an intensity of a bin with intensities of neighboring bins; and
   determining a grade for the display based on the maximum intensity and local contrast levels.

14. The method of claim 13, wherein determining a grade comprises referencing a look up table.

15. The method of claim 13, wherein determining a grade comprises:
   computing a light leakage indicator according to the formula: $L = \text{Log}(P) + (\partial P)(W_s)(S^{(1-P/P_t)})$, where P is the peak intensity, $$S = \frac{2|(L_{i,j} - L_{i\pm1,j\pm1})|}{(L_{i,j} + L_{i\pm1,j\pm1})},$$

∂p a difference in Log(P) between a set of grades, Ws is a slope weight factor, and Pt is a human correlation coefficient that operates as a threshold where an effect of S starts dominating; and giving the display a score based on the light leakage indicator.

16. The method of claim 14 further comprising:
computing a volume intensity value; and
looking up a grade corresponding to the volume intensity value and the maximum intensity for a bin.

17. A system for objectively rating a display comprising:
an image capture device;
a first fixture configured to hold the image capture device in a fixed position;
a second fixture configured to secure a display, wherein the image capture device is directed towards the second fixture; and
a computing device in communication with the image capture device and configured to receive an image from the image capture device, wherein the computer is configured to:

divide a perimeter of the image into a set of blocks, wherein each block comprises a plurality of cells;
create an intensity map of the captured image;
determine a maximum intensity for a cell in the plurality of cells;
calculate a local contrast level for the plurality of cells in each block of the captured image;
determine a maximum local contrast level for a block comprising comparing an intensity of a cell with intensities of neighboring cells; and
determine a grade for the display based on the maximum intensity and local contrast levels.

18. The system of claim 17, wherein the image capture device is configured to capture a monochromatic image of the display.

19. The method of claim 1, wherein the first parameter value exceeds the threshold and wherein the second parameter is given the first weighting in computing the grade.

20. The method of claim 1, wherein the first parameter value is below the threshold and wherein the second parameter is given the second weighting in computing the grade.

21. The method of claim 1, wherein computing the grade comprises giving a third weighting to the first parameter.

\* \* \* \* \*